United States Patent
Alberts et al.

(10) Patent No.: US 12,486,830 B2
(45) Date of Patent: Dec. 2, 2025

(54) CONTROLLING AMOUNT OF ACTIVE DAMPING TO BE APPLIED DURING OPERATION OF A WIND TURBINE

(71) Applicant: Siemens Gamesa Renewable Energy A/S, Brande (DK)

(72) Inventors: Johannes Gerhardes Wardjan Alberts, Brøndby Strand (DK); Safak Burak Altun, Harlev (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/832,819

(22) PCT Filed: Jan. 9, 2023

(86) PCT No.: PCT/EP2023/050297
§ 371 (c)(1),
(2) Date: Jul. 24, 2024

(87) PCT Pub. No.: WO2023/147960
PCT Pub. Date: Aug. 10, 2023

(65) Prior Publication Data
US 2025/0146471 A1 May 8, 2025

(30) Foreign Application Priority Data
Feb. 1, 2022 (EP) .................... 22154449

(51) Int. Cl.
*F03D 7/04* (2006.01)
*F03D 7/02* (2006.01)

(52) U.S. Cl.
CPC ............. *F03D 7/048* (2013.01); *F03D 7/02* (2013.01); *F03D 7/042* (2013.01)

(58) Field of Classification Search
CPC ........ F03D 7/0272; F03D 7/02; F03D 7/0284; F03D 7/0298; F03D 7/0302; F03D 7/048;
(Continued)

(56) References Cited

U.S. PATENT DOCUMENTS

2010/0013235 A1 * 1/2010 Bjerge ................ F03D 7/0296
290/55
2015/0381089 A1 12/2015 Tarnowski et al.
(Continued)

FOREIGN PATENT DOCUMENTS

EP 2754889 A1 * 7/2014 .......... F03D 7/0272
EP 3318751 A1 * 5/2018 ............. F03D 17/00
(Continued)

OTHER PUBLICATIONS

PCT International Search Report and Written Opinion of International Searching Authority mailed Apr. 25, 2023 corresponding to PCT International Application No. PCT/EP2023/050297 filed Jan. 9, 2023.

Primary Examiner — Courtney D Heinle
Assistant Examiner — Ryan C Clark
(74) Attorney, Agent, or Firm — Schmeiser, Olsen & Watts LLP

(57) ABSTRACT

A method is provided of controlling an amount of active damping to be applied by an active damping system during operation of a wind turbine, the method including (a) receiving a power reference signal indicative of the power to be produced by the wind turbine, (b) determining a relative power reference change indicative of a change in the power reference signal, (c) determining the amount of active damping to be applied based on the relative power reference change, and (d) outputting the determined amount of active damping to the active damping system. Furthermore, a corresponding device, a wind turbine including such a (Continued)

device, a wind park including such wind turbines, and a computer program product are provided.

18 Claims, 2 Drawing Sheets

(58) Field of Classification Search
CPC ............ F05B 2260/96; F05B 2260/964; F05B 2270/334; F05B 2270/337
See application file for complete search history.

(56) References Cited

U.S. PATENT DOCUMENTS

2017/0328342 A1* 11/2017 Kjær ........................ F03D 9/25
2018/0138708 A1    5/2018 De Rijcke et al.

FOREIGN PATENT DOCUMENTS

| EP | 3581791 A1 | 12/2019 | | |
| EP | 3734833 A1 * | 11/2020 | ............. | F03D 15/00 |
| WO | WO-2018077530 A1 * | 5/2018 | ........... | F03D 7/0272 |
| WO | 2021129914 A1 | 7/2021 | | |

* cited by examiner

CONTROLLING AMOUNT OF ACTIVE DAMPING TO BE APPLIED DURING OPERATION OF A WIND TURBINE

CROSS-REFERENCE TO RELATED APPLICATIONS

This application is a national stage of PCT Application No. PCT/EP2023/050297, having a filing date of Jan. 9, 2023, which claims priority to EP Application Serial No. 22154449.7, having a filing date of Feb. 1, 2022, the entire contents both of which are hereby incorporated by reference.

FIELD OF TECHNOLOGY

The following relates to the field of wind turbines, in particular to methods and devices for controlling active damping during operation of a wind turbine. Furthermore, the following relates to wind turbines capable of controlling active damping during operation, to wind parks comprising such wind turbines, and to a computer program product.

BACKGROUND

In a wind park, each wind turbine produces the amount of power requested, as defined by the power reference sent to it by the park pilot. On average, this requested power is produced, but it may also contain zero-mean damping components for the active drive-train damping, active tower damping, floater motion damping etc. These damping components have an optimal phase for damping the corresponding mechanical oscillations, and since these mechanical oscillations are typically not aligned on the site, i.e., they are not synchronized among the wind turbines in the wind park, the combined output of all damping components for all wind turbines even out on park level. Hence, on park level, oscillations are typically a fraction of a percent of the total power output.

However, in certain situations, the combined active damping components can align. Examples of such situations are large changes in the requested power from the turbines by the park pilot, such as steep power increases or large power drops, or situations like grid faults, where the requested power is the same, but the active power for a short period drops to 0 kW.

In these situations, the mechanical oscillations are excited and are also aligned in phase as the requested power change is sent simultaneously to all turbines. In this situation, the combined active damping component in the park output can reach the maximum allowed amount, which typically is a few percent of the park output. This alignment thus creates large oscillations on the park output that are fed into the grid.

Whereas wind power previously has been a marginal component on the grid, situations where large reference changes were made were insignificant compared to the stability of the grid. Now, and even more in the future, wind power is and will be a larger part of the energy mix, and situations where entire sites are running in stand-by, i.e., full speed (or almost full speed) and no power (or very little power) are becoming more common. These parks that run in stand-by are used to cover for short duration peaks in the demanded power of the grid, and wind farms are exceptionally well positioned in this role as they can ramp up to full power in a few seconds, compared to much larger time constants gas or especially coal fired power plants.

However, if the oscillations from the active damping components are large, it can destabilize the grid.

There may thus be a need for an effective and cost-efficient way of avoiding or at least reducing this problem.

SUMMARY

According to a first aspect of embodiments of the invention, there is provided a method of controlling an amount of active damping to be applied by an active damping system in order to dampen oscillating movements in structural components of a wind turbine during operation of the wind turbine, the method comprising (a) receiving a power reference signal indicative of the power to be produced by the wind turbine, (b) determining a relative power reference change indicative of a change in the power reference signal, (c) determining the amount of active damping to be applied based on the relative power reference change, and (d) outputting the determined amount of active damping to the active damping system.

This aspect of embodiments of the invention is based on the idea that the amount of active damping to be applied during operation of the wind turbine is determined on the basis of the change in the power reference signal. Thereby, a low (or even zero) amount of active damping may be applied when the relative change in the power reference is high (e.g., when the absolute change in the power reference signal is close or equal to the nominal power value), whereas a high amount of active damping may be applied when the relative change in the power reference signal is low (e.g., when the absolute change in the power reference signal is significantly less than the nominal power value, or even zero).

In the present context, the term "active damping" may in particular denote a functionality in a wind turbine controller which, based on measurement from various sensors, such as accelerometers or rotational speed detectors, applies adjustments to the set point value of the wind turbine converter in order to reduce or dampen oscillating movements and corresponding structural loads in the mechanical structure of the wind turbine, such as bending tower movements.

By applying less active damping in situations where the power reference signal changes significantly, the amount of damping components occurring in the output power from the wind turbine is reduced accordingly, as are the corresponding potential disturbances in the power grid. This will of course result in a corresponding increase in the structural loads on the wind turbine, but since large changes in the power reference signal do not occur often, this will not have any significant impact on the lifetime of the wind turbine.

According to an embodiment of the invention, determining the relative power reference change comprises: (a) determining a current power reference value based on the power reference signal, (b) determining a steady-state power reference value based on the power reference signal, and (c) calculating the relative power reference change based on an absolute difference between the current power reference value and the steady-state power reference value.

In the present context, the term "current power reference value" may in particular denote an instantaneous (or close to instantaneous) value of the power reference signal, i.e., the value of the power reference signal at a given point in time.

In the present context, the term "steady-state power reference value" may in particular denote a value that is representative of the power reference signal as seen over a longer (i.e., non-instantaneous) period of time.

In this embodiment, the absolute difference between the current power reference value and the steady-state power reference value is used to calculate the relative power reference change. In other words, the larger this absolute difference is, the larger the resulting relative power reference change will be.

According to an embodiment of the invention, calculating the relative power reference change further comprises dividing the absolute difference between the current power reference value and the steady-state power reference value with a nominal power value of the wind turbine.

In the present context, the term "nominal power value" may in particular denote the amount of power to be produced by the wind turbine during normal operation.

In other words, the relative power reference change is normalized relative to the nominal power value of the wind turbine. Thus, the relative power reference change will be a number between zero and one.

According to an embodiment of the invention, determining the current power reference value comprises filtering the power reference signal with a first low-pass filter having a first time constant, such as a first time constant around 1 second.

According to an embodiment of the invention, determining the steady-state power reference value comprises filtering the power reference signal with a second low-pass filter having a second time constant, such as a second time constant between 25 seconds and 75 seconds, in particular around 50 seconds.

According to an embodiment of the invention, the second time constant is larger than the first time constant.

In other words, the current power reference value is determined by filtering the power reference signal with a relatively fast low-pass filter while the steady-state power reference value is determined by filtering the power reference signal with a relatively slow low-pass filter. Here, the reference to "fast" and "slow" indicates the relationship between the time constants of the two low-pass filters. It should be emphasized that the "fast" low-pass filter is not mandatory and that in some embodiments the power reference value may be obtained directly (without filtering) the power reference signal.

According to an embodiment of the invention, the second time constant is between 25 and 75 times the first time constant, in particular about 50 times the first time constant.

According to an embodiment of the invention, determining the amount of active damping comprises: (a) if the relative power reference change exceeds a predetermined threshold value: calculating the amount of active damping based on a difference between the relative power reference change and the predetermined threshold value, or (b) if the relative power reference change does not exceed the predetermined threshold value: setting the amount of active damping to a value corresponding to a nominal amount of active damping.

In other words, as long as the relative power reference change does not exceed the predetermined threshold value, the amount of active damping to be applied is set to the nominal amount, i.e., the active damping system is allowed to operate normally, without any reductions or limitations. If, on the other hand, the relative power reference change exceeds the predetermined threshold value, then the amount of active damping to be applied by the active damping system is calculated based on a difference between the relative power reference change and the predetermined threshold value. In embodiments, the larger this difference is, the smaller may the amount of active damping be. In other words, as soon as the relative power reference change exceeds the predetermined threshold value, the amount of active damping to be applied is reduced in dependency on the relative power reference change.

Thereby, relatively small values of the relative power reference change do not cause a reduction in the applied amount of active damping, whereas larger values of the relative power reference change cause a corresponding reduction in the applied amount of active damping. The larger the relative power reference change is, the larger is the reduction in active damping.

In one example, the amount of active damping may be calculated in linear dependency of the relative power reference change, i.e., with a fixed slope, as long as the relative power reference change exceeds the predetermined threshold value.

According to an embodiment of the invention, determining the amount of active damping comprises linear interpolation and/or a look-up table mapping the amount of active damping to relative power reference change.

Here, the dependency between the amount of active damping to be applied and the relative power reference change may be piecewise linear, i.e., with different slopes in different ranges of the relative power reference change. This can be implemented by utilizing a look-up table and/or linear interpolation.

According to an embodiment of the invention, the amount of active damping is determined as a percentage of a nominal amount of active damping.

In other words, the nominal amount of active damping, i.e., the amount of active damping that is applied during normal operation, corresponds to 100%

According to an embodiment of the invention, the amount of active damping is to be applied is inversely related to the relative power reference change.

In other words, the larger the relative power reference change is, the smaller is the determined amount of active damping, and the smaller the relative power reference is, the larger is the determined amount of active damping.

According to a second aspect of embodiments of the invention, there is provided a device for controlling an amount of active damping to be applied by an active damping system in order to dampen oscillating movements in structural components of a wind turbine during operation of the wind turbine, the device comprising (a) an input for receiving a power reference signal indicative of the power to be produced by the wind turbine, (b) processing circuitry configured to (b1) determine a relative power reference change indicative of a change in the power reference signal, and (b2) determine the amount of active damping to be applied based on the relative power reference change, and (c) an output for outputting the determined amount of active damping to the active damping system.

This aspect of embodiments of the invention is essentially based on the same idea as the first aspect discussed above and amounts to a device capable of performing the methods according to the first aspect as discussed above. Hence, the explanations and advantages provided and discussed above in conjunction with the first aspect apply equally to this second aspect.

The processing circuitry may be standard processing device with corresponding software, an ASIC device, a correspondingly programmed DSP device, or any other suitable processing device known in the conventional art.

According to an embodiment of the invention, the processing circuitry comprises (a) a first unit configured to determine a current power reference value based on the power reference signal, (b) a second unit configured to determine a steady-state power reference value based on the power reference signal, and (c) a calculating unit configured to calculate the relative power reference change based on an absolute difference between the current power reference value and the steady-state power reference value.

Either the first unit, the second unit, and the calculating unit may be implemented as independent hardware units, or as functional blocks or software modules within one or more hardware units.

According to an embodiment of the invention, the first unit comprises a first low-pass filter having a first time constant and being configured to determine the current power reference value by filtering the power reference signal. Furthermore, the second unit comprises a second low-pass filter having a second time constant and being configured to determine the steady-state power reference value by filtering the power reference signal. The second time constant is larger than the first time constant. For example, the second time constant may be between 25 and 75 times larger than the first time constant, such as around 50 times larger than the first time constant.

The first and second low-pass filters may be implemented as dedicated circuit modules, as correspondingly programmed DSP modules, or in any other way known in the conventional art.

Alternatively, only the second low pass-filter may be used while the current power reference value is determined directly (i.e., without filtering) from the power reference signal.

According to an embodiment of the invention, the processing circuitry is configured to determine the amount of active damping by (a) calculating the amount of active damping based on a difference between the relative power reference change and the predetermined threshold value, if the relative power reference change exceeds a predetermined threshold value, or (b) setting the amount of active damping to a value corresponding to a nominal amount of active damping, if the relative power reference change does not exceed the predetermined threshold value.

According to an embodiment of the invention, the processing circuitry is configured to determine the amount of active damping by utilizing linear interpolation and/or a look-up table mapping the amount of active damping to relative power reference change.

According to a third aspect of embodiments of the invention, there is provided a wind turbine comprising (a) an active damping system configured to modify one or more reference values received at the wind turbine in order to dampen oscillating movements in structural components of the wind turbine, and (b) a device according to the second aspect or any one of the embodiments thereof. The device is adapted to control the amount of active damping applied by the active damping system during operation of the wind turbine.

This aspect of embodiments of the invention is essentially based on the same idea as the first and second aspects described above and utilizes a device according to the second aspect to obtain the corresponding advantages in a wind turbine with an active damping system.

In embodiments, the wind turbine according to this aspect benefits from a reduction in active damping components being present in the output power in cases where the power reference signal changes significantly. Thereby, an unwanted accumulation of active damping components can be prevented at the output of a wind park comprising a large number of such wind turbines.

According to a fourth aspect of embodiments of the invention, there is provided a wind park comprising a plurality of wind turbines according to the third aspect.

As mentioned above, this wind park is capable of preventing significant disturbances in the total power output to the grid when the power references for all (or some of) the wind turbines in the wind park changes significantly (in comparison to the nominal power output).

According to a fifth aspect of embodiments of the invention, there is provided a computer program product comprising a computer readable hardware storage device having computer readable program code stored therein, the program code executable by a processor of a computer system to implement a method, comprising computer executable instructions which, when executed by a processor of a computer, causes the computer to perform the method according to the first aspect or any one of the embodiments thereof.

This aspect resides in a computer program product which, upon installation on a suitable computer, such as a wind turbine controller, is capable of performing the method according to the first aspect discussed above.

It is noted that embodiments of the invention have been described with reference to different subject matters. Some embodiments have been described with reference to method type claims whereas other embodiments have been described with reference to apparatus type claims. However, a person skilled in the conventional art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of embodiments of the present invention are apparent from the examples of embodiments to be described hereinafter and are explained with reference to the examples of embodiments.

BRIEF DESCRIPTION

Some of the embodiments will be described in detail, with reference to the following figures, wherein like designations denote like members, wherein.

DETAILED DESCRIPTION

Figure 1:
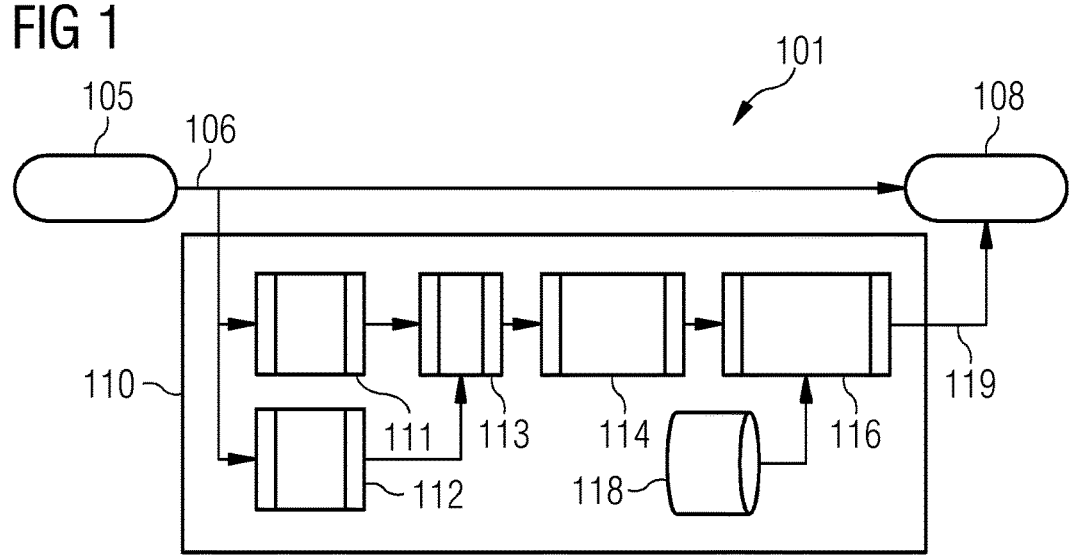
FIG. 1 shows a device according to an exemplary embodiment.

FIG. 1 shows a device 110 according to an exemplary embodiment that is arranged within a wind park 101. The wind park 101 comprises a wind park pilot 105 and at least one wind turbine 108. The wind park pilot 105 determines and transmits various control signals to the wind turbines in the wind park 101, in particular a power reference signal 106 for the wind turbine 108. In most cases, the wind park 101 will comprise a plurality of wind turbines, but for ease of illustration, FIG. 1 only shows a single wind turbine 108.

The device 110 comprises an input that receives the power reference signal 106 from the park pilot 105. The device further comprises an output for outputting an amount of active damping 119 to the wind turbine 108, which comprises an active damping system (not shown) that is capable of dampening e.g., tower oscillating movement by modifying the power reference values for the wind turbine converter in response to various measurement signals as known in the conventional art. The device 110 further comprises various processing circuitry that is generally configured to determine a relative power reference change indicative of a change in the power reference signal 106 relative to a nominal power value of the wind turbine, and to determine the amount 119 of active damping to be applied based on the relative power reference change.

More specifically, the processing circuitry comprises a first filter 111 having a first (low) time constant, a second filter 112 having a second (high) time constant, an absolute difference calculating unit 113, a normalizing unit 114, a calculating and interpolating unit 116, and an (optional) look-up table 118. In an alternative embodiment, the first filter 111 may be replaced by a direct pass-through of the (unfiltered) power reference signal 106.

Both filters 111, 112 are low-pass filters and coupled to receive the power reference signal 106 from the input. In this embodiment, the first time constant is around 1 second and the second time constant is around 50 seconds. Other values may be chosen depending on the circumstances. Due to the different time constants, the first (or fast) filter 111 provides an output signal that is indicative of the current power reference value while the second (or slow) filter 112 provides an output signal that is indicative of the steady-state power reference value.

The output signals of both filters 111, 112 are supplied to absolute difference calculating unit 113. The normalizing unit 114 receives the absolute difference between the current power reference value and the steady-state power reference value, divides it by the nominal power value of the wind turbine 108 and outputs the thus resulting relative power reference change to the calculating and interpolating unit 116, which in turn determines the corresponding amount of active damping 119 that is to be applied by the active damping system in wind turbine 108.

The calculating and interpolating unit 116 may perform this determination in various ways, of which some utilize the optional look-up table 118 while others do not. In embodiments relying on the look-up table 118, the calculating and interpolating unit 116 may find the two values in the look-up table 118 that are closest to the relative power reference change received from that normalizing unit 114 and then apply linear interpolation to determine the amount of active damping 119. Alternatively, the calculating and interpolating unit 116 may calculate the amount of active damping 119 directly from the received relative power reference change, e.g., by applying a linear relation. In both cases, a predetermined threshold value may be implemented to assure that the amount of active damping is not reduced for small values of relative power reference change. In other words, a reduction is not being applied until the relative power reference change exceeds the predetermined threshold value. This will be discussed in further detail below.

Figure 2:
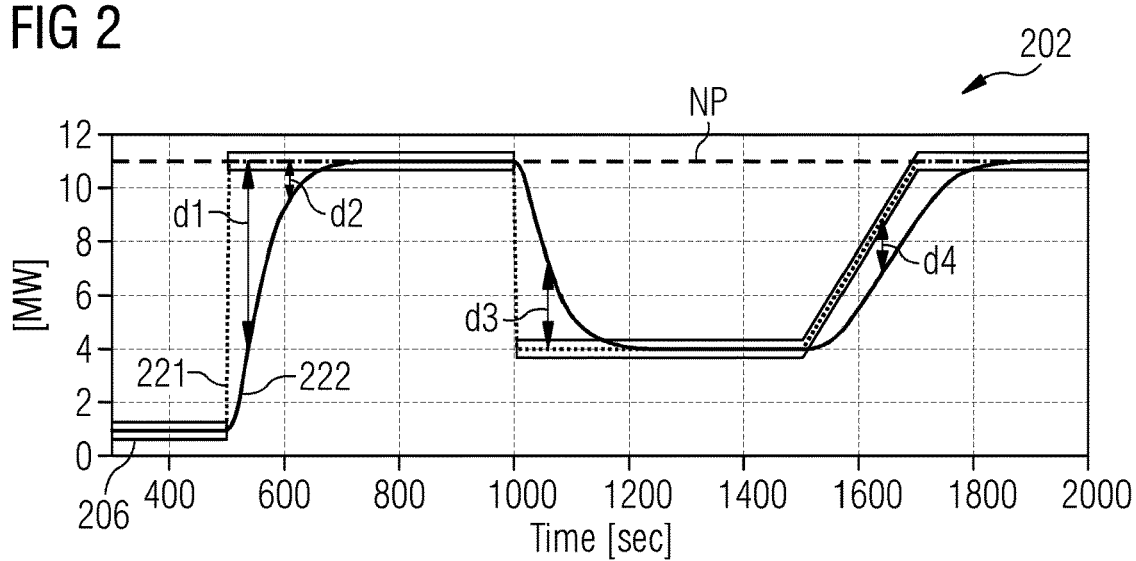
FIG. 2 shows a plot of power reference signals as used in an exemplary embodiment.

FIG. 2 shows a plot 202 of power reference signals as used in an exemplary embodiment. More specifically, the plot 202 shows the power reference signal 206 from the park pilot 105, the current power reference signal 221 (output by the fast low-pass filter 111 in FIG. 1), the steady-state power reference signal 222 (output by the slow low-pass filter 112 in FIG. 1), and the nominal power value NP of the wind turbine 108. The power reference signal 206 is shown as a rather thick curve to illustrate that it includes a certain amount of noise. The current power reference signal 221 follows the course of the power reference signal 206 closely, but without the noise as this is removed in the first low-pass filter 111, while the steady-state power reference signal 222, due to the longer time constant of the second low-pass filter 112, takes some time to follow the changes in the power reference signal 206. Hence, during and after changes in the power reference signal 206, there will be a certain difference between the current power reference signal 221 and the steady-state power reference signal 222. This can be seen at three instances in the plot 202.

Firstly, at t=500 s, the power reference signal 206 is stepped up from 1 MW to 11 MW (corresponding to the nominal power NP). The current power reference signal 221 follows directly and also steps up to 11 MW. However, as can be seen, shortly after the step, at t≈530 s, the difference between the current power reference signal 221 and the steady-state power reference signal 222 is significant, i.e., d1≈7 MW, while at t≈600 s, the difference is significantly reduced, i.e., d2≈1.5 MW.

Secondly, later at t=1000 s, the power reference signal 206 is stepped down from NP=11 MW to 4 MW, i.e., a somewhat smaller step than the first one. The current power reference signal 221 again follows directly and also steps down to 4 MW. Also in this case, the difference between the current power reference signal 221 and the steady-state power reference signal 222 is significant, i.e., d3≈3 MW at t≈1050 s.

Thirdly, at t=1500 s, the power reference signal 206 is slowly ramped up from 4 MW to NP (11 MW) over a period of 200 s. As before, the current power reference signal 221 follows the power reference signal 206 closely, while the steady-state power reference signal 222 is delayed around 100 s. The difference between the current power reference signal 221 and the steady-state power reference signal 222 is almost constant throughout the ramping period, i.e., d4≈2 MW.

Figure 3:
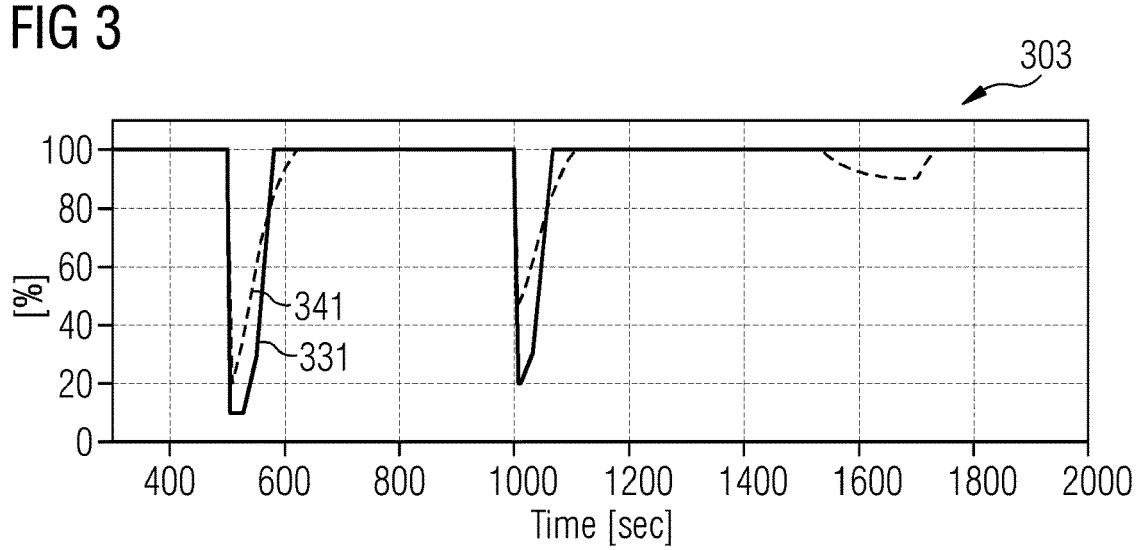
FIG. 3 shows a plot of active damping amounts determined in accordance with two exemplary embodiments.
Figure 4:
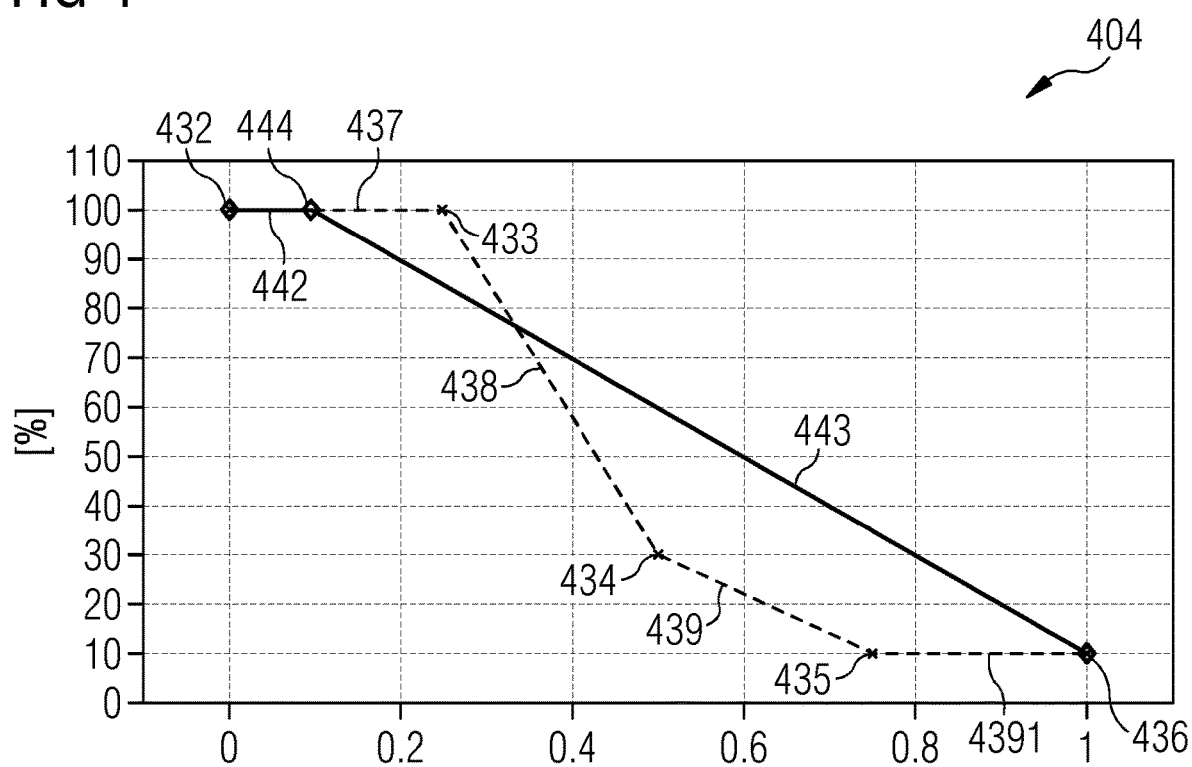
FIG. 4 shows a plot of a relationship between normalized power reference change and active damping amounts in accordance with two exemplary embodiments.

FIG. 3 shows a plot 303 of active damping amounts determined in accordance with two exemplary embodiments for the power reference signal 206 shown in FIG. 2. Furthermore, FIG. 4 shows a plot of a relationship between normalized power reference change and active damping amounts as utilized in these two exemplary embodiments.

In the first embodiment, the amount of active damping 331 (in % of nominal) is determined by using a look-up table and linear interpolation. More specifically, the look-up table is represented by the points 432, 433, 434, 435, and 436 and the corresponding linear curve segments 437, 438, 439, and 4391 in FIG. 4. As can be seen, no reduction in active damping is applied as long as the relative (or normalized) power reference change remains below 0.25.

In the second embodiment, the amount of active damping 341 is determined by applying a simple linear relation between the normalized power reference change and the amount of active damping to be applied (in %). This linear relation is illustrated by the linear curve segments 442 and 443 as well as an offset (or threshold) point 444 in FIG. 4. As can be seen, no reduction in active damping is applied as long as the relative (or normalized) power reference change remains below 0.1. Hence, the threshold value is smaller in this embodiment compared to the first embodiment with the look-up table discussed just above.

The linear relation may for example be as follows:

$$AD = 100\% - \max(0, RPRC * 100 - OV),$$

where AD is the amount of active damping in percent, RPRC is the relative (or normalized) power reference change, and OV is the offset or threshold value that determines the largest value of RCPC for which no reduction is applied. In the above referenced example shown in FIG. 4, OV is 0.1.

For the sake of completion, RPRC may be determined as follows:

$$RPRC = abs(CPR - SSPR)/NP,$$

where CPR is the current power reference signal value, i.e., the power reference signal 106 filtered by the fast low-pass filter 111, SSPR is the steady-state power reference signal value, i.e., the power reference signal filtered by the slow low-pass filter 112, and NP is the nominal power of the wind turbine 108.

Both the difference in threshold value and the varying slope in the first embodiment can be seen in the plot 303 of FIG. 3. As regards the step-up at t=500 s (see also FIG. 2), the amount of active damping according to 331 is lower than according to 341 for most of the time and in particular remains at 10% for some time, whereas the curve 341 only goes down to 20% and starts increasing almost instantaneously. Similar observations apply as regards the step-down at t=1000 s (see also FIG. 2): the curve 331 goes down to 20% and remains below the curve 341 for most of the time, while the curve 341 only goes down slightly below 50%. As regards the ramp-up between t=1500 s and t=1700 s, the curve 331 remains at 100% while the curve 341 goes down (rather slowly) to around 90%. This difference in behavior is caused by the different offset/threshold values as discussed above in conjunction with FIG. 4.

Summarizing the above and generally speaking, embodiments of the present invention solve the problem of aligning active damping components in situations that involve significant changes in the power reference signal 106 to the wind turbines 108 in a wind park 101 by disclosure solves this issue, by temporarily lowering the nominal active damping component relative to the magnitude of the power reference change requested by the park pilot 105. Over time, the alignment or synchronization will disappear again due to the following reasons:

(1) As the structural frequencies are not identical among the wind turbines, but have small variations, over time the phase of these structural oscillations will start deviating enough that the active damping components will start cancelling each other on park level. This time is a function of the spread in natural frequencies of the structural components. These differences can be caused e.g., by manufacturing variations, soil changes between turbines in the same park, or variations in size of the foundations to cover for different water depth across an offshore wind farm.

(2) The oscillations of the structural components will decay over time if they are not continuously excited. For a single step change in the power reference, there will be a natural damping of the structure plus the impact of a lowered active damping component (the active damping of the structure will be a function of the amount of active damping power (or torque) used.)

The reason why the reduction of the active damping component should be relative to the change in active power is that small changes will not excite the structural frequencies significantly and thereby not trigger a significant synchronization of these structural oscillations (and their active damping components). Large changes will excite these structures and cause such synchronization. Small changes in power reference happen frequently, whereas large changes in power reference are less common and are restricted to prevent increased fatigue loading of the turbine and its foundation.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling an amount of active damping to be applied by an active damping system to dampen oscillating movements in structural components of a wind turbine during operation of the wind turbine, the method comprising:
    receiving a power reference signal indicative of a power to be produced by the wind turbine;
    determining a relative power reference change indicative of a change in the power reference signal based on an absolute difference between a current power reference value and a steady-state power reference value;
    determining the amount of active damping to be applied based on the relative power reference change; and
    outputting the amount of active damping to the active damping system.

2. The method according to claim 1, further comprising:
    determining the current power reference value based on the power reference signal;
    determining the steady-state power reference value based on the power reference signal; and
    calculating the relative power reference change based on the absolute difference between the current power reference value and the steady-state power reference value.

3. The method according to claim 2, wherein calculating the relative power reference change further comprises dividing the absolute difference between the current power reference value and the steady-state power reference value with a nominal power value of the wind turbine.

4. The method according to claim 2, wherein determining the current power reference value comprises filtering the power reference signal with a first low-pass filter having a first time constant.

5. The method according to claim 4, wherein determining the steady-state power reference value comprises filtering the power reference signal with a second low-pass filter having a second time constant.

6. The method according to claim 5, wherein the second time constant is between 25 and 75 times the first time constant.

7. The method according to claim 1, wherein determining the amount of active damping comprises:
    if the relative power reference change exceeds a predetermined threshold value: calculating the amount of active damping based on a difference between the relative power reference change and the predetermined threshold value, or
    if the relative power reference change does not exceed the predetermined threshold value:
    setting the amount of active damping to a value corresponding to a nominal amount of active damping.

8. The method according to claim 1, wherein determining the amount of active damping comprises linear interpolation and/or a look-up table mapping the amount of active damping to relative power reference change, and/or wherein the amount of active damping is determined as a percentage of a nominal amount of active damping.

9. The method according to claim 1, wherein the determined amount of active damping to be applied is inversely related to the relative power reference change.

10. A device for controlling an amount of active damping to be applied by an active damping system to dampen oscillating movements in structural components of a wind turbine during operation of the wind turbine, the device comprising:
an input for receiving a power reference signal indicative of a power to be produced by the wind turbine;
processing circuitry configured to:
determine a relative power reference change indicative of a change in the power reference signal based on an absolute difference between a current power reference value and a steady-state power reference value, and
determine the amount of active damping to be applied based on the relative power reference change; and
an output for outputting the determined amount of active damping to the active damping system.

11. The device according to claim 10, wherein the processing circuitry comprises:
a first unit configured to determine the current power reference value based on the power reference signal;
a second unit configured to determine the steady-state power reference value based on the power reference signal; and
a calculating unit configured to calculate the relative power reference change based on the absolute difference between the current power reference value and the steady-state power reference value.

12. The device according to claim 11,
wherein the first unit comprises a first low-pass filter having a first time constant and being configured to determine the current power reference value by filtering the power reference signal;
wherein the second unit comprises a second low-pass filter having a second time constant and being configured to determine the steady-state power reference value by filtering the power reference signal; and
wherein the second time constant is larger than the first time constant.

13. A wind turbine comprising:
an active damping system configured to modify one or more reference values received at the wind turbine to dampen oscillating movements in structural components of the wind turbine; and
a device according to claim 10 configured to control the amount of active damping applied by the active damping system during operation of the wind turbine.

14. A wind park comprising a plurality of wind turbines according to claim 13.

15. A computer program product comprising a computer readable hardware storage device having computer readable program code stored therein, the program code executable by a processor of a computer system to implement a method according to claim 1.

16. The method according to claim 4, wherein the first time constant is around 1 second.

17. The method according to claim 5, wherein the second time constant is between 25 seconds and 75 seconds.

18. The device according to claim 12, wherein the second time constant is between 25 and 75 times larger than the first time constant.

* * * * *